United States Patent [19]

Shifflett

[11] Patent Number: 5,201,022

[45] Date of Patent: Apr. 6, 1993

[54] COATED OPTICAL FIBER

[75] Inventor: Peter Shifflett, Fremont, Calif.

[73] Assignee: Johnson Matthey Inc., Valley Forge, Pa.

[21] Appl. No.: 703,010

[22] Filed: May 20, 1991

[51] Int. Cl.$^5$ .......................... G02B 6/00; G02B 6/16
[52] U.S. Cl. .................................. 385/128; 65/3.11;
427/163; 374/130; 356/43; 250/227.14;
385/141
[58] Field of Search .............. 350/96.10, 96.15, 96.29,
350/96.30, 96.33, 96.34; 250/227.14; 356/43,
44; 374/130, 131; 65/3.11, 3.12; 427/163;
385/123, 124, 126–129, 141, 144, 145

[56] References Cited

U.S. PATENT DOCUMENTS

| | | | |
|---|---|---|---|
| 3,626,758 | 12/1971 | Stewart et al. | 356/44 X |
| 4,028,080 | 6/1977 | DiVita et al. | 350/96.30 X |
| 4,396,409 | 8/1983 | Bailey et al. | 65/3.11 |
| 4,418,984 | 12/1983 | Wysocki et al. | 385/123 |
| 4,504,113 | 3/1985 | Baak | 350/96.33 |
| 4,518,628 | 5/1985 | Biswas et al. | 427/163 X |
| 4,576,486 | 3/1986 | Dils | 374/131 |
| 4,735,856 | 4/1988 | Schultz et al. | 350/96.29 X |
| 4,750,139 | 6/1988 | Dils | 250/227.23 X |
| 4,794,619 | 12/1988 | Tregay | 374/131 |
| 4,804,246 | 2/1989 | Kobayashi et al. | 385/128 X |
| 4,845,647 | 7/1989 | Dils et al. | 250/227.23 X |
| 4,874,222 | 10/1989 | Vacha et al. | 350/96.34 |
| 5,035,484 | 7/1991 | Ishiguro et al. | 385/123 |

FOREIGN PATENT DOCUMENTS

| | | |
|---|---|---|
| 2021590 | 1/1991 | Canada . |
| 375399 | 12/1989 | European Pat. Off. . |
| 410851 | 7/1990 | European Pat. Off. . |
| 60-107007 | 6/1985 | Japan . |
| 2045921 | 2/1980 | United Kingdom . |

OTHER PUBLICATIONS

Dakin et al., Letter, 9 *Optical and Quantum Electronics* 540-4 (1977).

*Primary Examiner*—Akm E. Ullah
*Attorney, Agent, or Firm*—Christie, Parker & Hale

[57] ABSTRACT

A coated, embrittlement resistant optical fiber thermometer fiber is disclosed, which can be a sapphire or silica fiber with a metallic coating which prevents the fiber from becoming brittle at high temperature, and enhances transmission of radiation through the fiber. The coating can be applied over a thin "conductive" film attached to the fiber exterior using vacuum metallization, sputtering, or organo-metallic deposition. The coating may comprise pure platinum electroplated over a thin conductive film. The fiber may include a first end terminating in a blackbody radiator in a furnace and a second end terminating at a receptor apparatus. A coated fiber of the present invention provides a hermetic seal around the fiber to prevent its exposure to hydroxyl ions in the atmosphere. Fibers of the invention will remain flexible even after exposure to temperatures well over 1000 degrees Centigrade. The coating also prevents unwanted external radiation from entering the fiber.

7 Claims, 2 Drawing Sheets

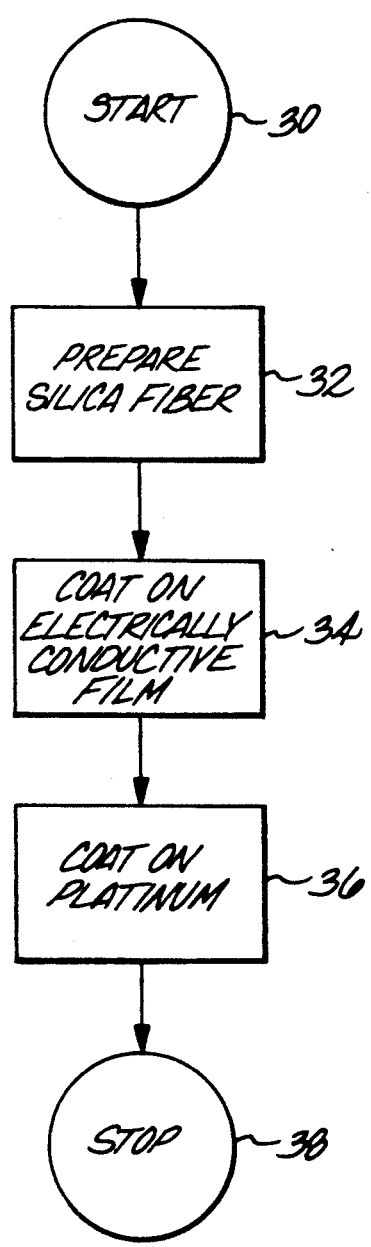

COATED OPTICAL FIBER

FIELD OF THE INVENTION

The present invention relates generally to optical fiber technology. The invention specifically relates to optical fibers coated, sheathed, or otherwise treated for exposure to high temperatures and used for intrinsic temperature sensing.

BACKGROUND OF THE INVENTION

In the semiconductor manufacturing industry, high-temperature furnaces are used to create semiconductor junctions and circuits by exposing semiconductor materials to chemicals under high temperature. To regulate the desired chemical reactions, and to ensure consistent quality, accurate control of furnace temperature is required. The furnace temperature may exceed 1000 degrees Centigrade.

Control may be achieved by creating a feedback loop in which a furnace temperature regulator is coupled to a temperature sensor in the furnace. The sensor detects internal furnace temperature and produces an output electrical signal proportional to the temperature. The signal is coupled to a computer, or to a temperature display, enabling either manual or automatic monitoring and adjustment of the furnace.

Conventionally, such temperature sensors comprise a precious metal thermocouple having a junction of two different precious metals or alloys. Heat applied to the function of the two metals causes a thermo-electric potential difference to develop which produces an output signal. Precious metals used in conventional thermocouples are intrinsically temperature resistant, i.e. their characteristics are not affected by exposure to high temperature, but have numerous disadvantages including extremely low output voltage, high cost, susceptibility to electromagnetic interference, low signal-to-noise ratio, and slow response time.

To overcome these disadvantages, optical fiber thermometers (OFTs) have been developed. An optical fiber thermometer system may comprise a black body radiator on an optical fiber having a "hot" end in a furnace under test and a "cold" end coupled to receiving and decoding electronics. The "cold" end of the fiber is coupled, outside the furnace under measurement, to a photodiode receiver assembly which includes amplification and temperature conversion electronics. Several fibers can be bundled to increase signal strength or to enable temperature sensing at several distributed locations in the furnace.

Most conventional optical fibers, such as those used in telephony and computer data transmission, become brittle or will melt in the high temperatures of semiconductor furnaces. Therefore, some known devices employ sapphire fibers or rods, which are highly heat-resistant and which provide good optical qualities. For example, U.S. Pat. Nos. 4,576,486, 4,750,139, and 4,845,647 disclose OFT systems using a high temperature sapphire fiber in a furnace coupled to a low-temperature silica fiber outside the furnace. Also, U.S. Pat. No. 3,626,758 shows a sapphire fiber for high-temperature sensing having a metallic coating sputtered on the tip which serves as a blackbody radiator.

However, optical quality Sapphire fibers are not commercially available, and sapphire rods are expensive, costing $1000 per foot or more. Sapphire rods are not flexible and thus have limited usefulness. Nevertheless, the temperature resistance of sapphire fibers makes them a desirable alternative for some applications.

Silica fiber is usually commercially available at $1 per foot or less, and is highly flexible. Unfortunately, harsh temperature and chemical conditions in a semiconductor furnace quickly cause silica fibers to become brittle and useless. Semiconductor furnaces can include large quantities of hydroxyl ions in the furnace atmosphere, and these ions can penetrate into the fiber and cause severe embrittlement in a very short time, even at temperatures well below the melting point of silica.

An article by J.P. Dakin and D.A. Kahn, "A novel fibre-optic temperature probe," Optical and Quantum Electronics 9 (1977), p. 540, proposes use of an OFT with a single silica fiber having a maximum operating temperature of 1,100° C. for direct temperature measurement. The fiber is encased in a fine stainless steel tube. However, the tube does not provide a hermetic seal and the reference does not disclose how to coat or treat the fiber to protect against embrittlement by hydroxyl ions. Moreover, the stainless steel tube suggested is inflexible.

U.S. Pat. No. 4,794,619 (Tregay) shows a thermally emissive surface implanted in a low-temperature optical fiber which may comprise glass. However, Tregay does not disclose how to protect the fiber from extreme temperatures or embrittlement. Moreover, external light can enter the fiber around the outer diameter of the implanted emissive material.

SUMMARY OF THE INVENTION

Therefore, those who use OFT sensors desire to have an OFT using low temperature silica fiber for optical temperature signal transmission. Accordingly, the present invention provides an optical fiber thermometer fiber with a core and a protective coating secured thereon. The core can be a silica optical fiber, and the coating can be a metallic coating which insulates the fiber against penetration of hydroxyl ions and thereby prevents embrittlement of the fiber. The coating also enhances transmission of radiation through the fiber. By way of example, the coating may comprise platinum applied over a thin electrically conductive material coated on the fiber using sputtering, organo-metallic deposition, vacuum metallization; or another method. The fiber may include a first end terminating in a blackbody radiator and a second end terminating at a receptor apparatus. A coated fiber of the present invention provides a hermetic seal around the fiber to prevent exposure to ions such as hydroxyl ions in the atmosphere. Fibers of the invention will remain flexible even after exposure to temperatures well over 1000 degrees Centigrade. The coating also prevents unwanted external radiation from entering the fiber.

BRIEF DESCRIPTION OF THE DRAWINGS

FIG. 3 is a flowchart showing process steps in a method of making the fiber of FIG. 1.

DETAILED DESCRIPTION OF THE PREFERRED EMBODIMENTS

Figure 1:
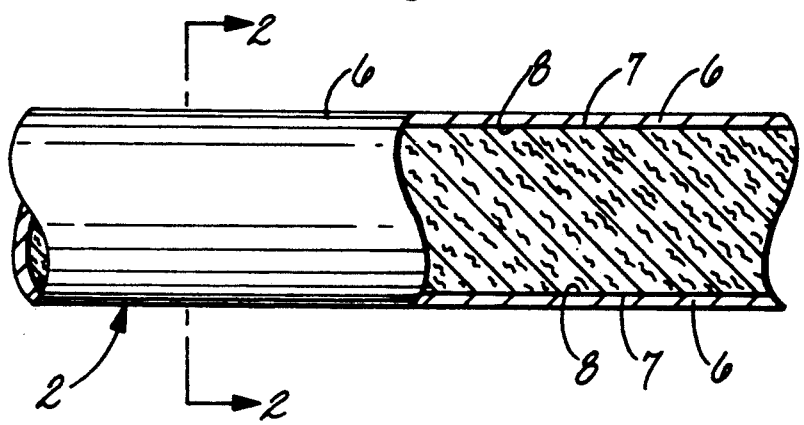
FIG. 1 is a longitudinal partial section view of a coated fiber of the present invention.
Figure 2:
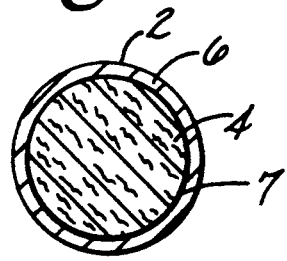
FIG. 2 is a lateral section view of the fiber of FIG. 1 taken at line 2—2 of FIG. 1.

FIG. 1 shows an optical fiber thermometer fiber 2 of the present invention. A flexible light-transmissive core 4 is provided and may comprise a conventional silica optical fiber or a sapphire rod. A coating means 6 is secured on the entire exterior surface 8 of the core.

The coating means may comprise a flexible metallic coating such as platinum. Preferably, but not necessarily, the platinum coating is electroplated on the fiber. The coating could also be sputtered on. First, the fiber is prepared for electroplating by coating a thin film 7 of electrically conductive material on the fiber. The film may be applied using sputtering, organo-metallic deposition, vacuum metallization, or another method. In one contemplated embodiment, nickel is sputtered on the fiber. Thereafter, a coating of pure platinum can be electroplated on the nickel.

The platinum coating is impervious to hydroxyl ions and is optically opaque. When used as a coating, metal prevents the fiber from becoming brittle through exposure to hydroxyl ions at high temperature. The coating provides a hermetic seal around the fiber to prevent penetration of hydroxyl ions in the atmosphere. Fibers of the invention will remain flexible even after exposure to temperatures well over 1000 degrees Centigrade. Since the coating is optically opaque, the coating also prevents unwanted external radiation from entering the fiber along the length of the fiber.

Attention is invited to the flowchart of FIG. 3, which illustrates steps taken in a preferred exemplary process of manufacturing a fiber of the invention. In the flowchart of FIG. 3, the process begins at step 30 and proceeds to the step of block 32 in which a conventional fiber is prepared for the process. Next a thin film of nickel is sputtered onto the fiber in the step of block 34. Thereafter, a platinum coating is electroplated over the nickel in the step of block 36. The process then concludes, resulting in production of a platinum coated silica fiber.

Figure 4:
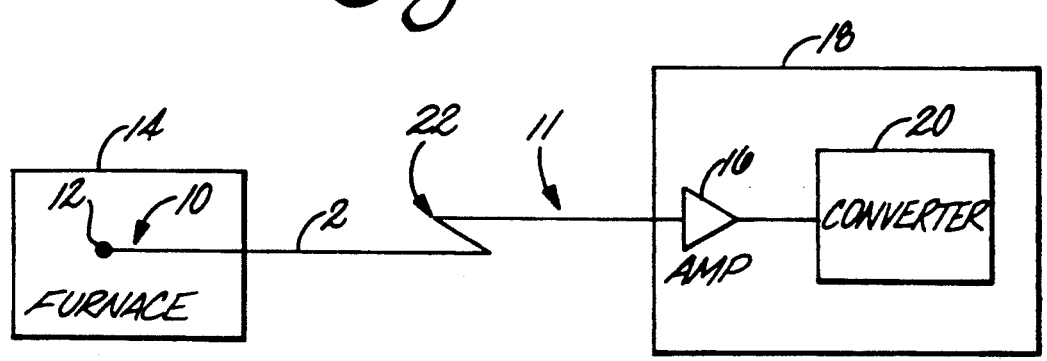
FIG. 4 is a diagram showing the fiber of FIG. 1 connected to a furnace and receptor.

When the fiber of the invention is used in an OFT system, the fiber may be arranged in a system as shown in FIG. 4 which includes an enclosed high temperature source such as a semiconductor manufacturing furnace 14 and a receptor apparatus 18. The fiber may include a first end 10 terminating in a blackbody radiator 12 which senses temperature in the furnace, and a second end 11 terminating at a receptor apparatus 18. The receptor may include a signal amplifier 16 and temperature data conversion electronics 20.

As indicated by the drawing at reference number 22, the flexible coating enables the fiber to bend at any point along its length. This feature permits the fiber to be retrofitted to any type of furnace or manufacturing site since the physical location of the fiber is not critical.

The present invention contemplates many variations and alternative embodiments. For example, sapphire fiber may be used rather than silica, and sputtering may be used to apply the coating. Thus, the scope of the present invention should not be limited to the foregoing detailed description, but rather should be determined by reference to the appended claims.

What is claimed is:

1. An optical fiber thermometer system comprising:
   (a) an enclosed high temperature source;
   (b) an embrittlement-resistant optically-transmissive fiber comprising a core and coating means secured thereon for insulating the core against penetration by hydroxyl ions;
   (c) the fiber including a first end terminating in a temperature sensor in the high temperature source, and a second end terminating at a receptor apparatus outside the high temperature source.

2. The system of claim 1, wherein the coating means comprises a flexible coating of a first metal secured on the core.

3. The system of claim 1, wherein the coating means comprises pure platinum.

4. The system of claim 1, wherein the coating means is optically opaque.

5. The system of claim 1, wherein the coating means is impervious to hydroxyl ions.

6. The system of claim 2, wherein the core comprises silica.

7. The system of claim 3, wherein the platinum is secured to a thin film of a second metal coated on the core.

* * * * *